No. 782,473. PATENTED FEB. 14, 1905.
R. URTEL & P. E. SCHILLING.
TOOTHED GEARING.
APPLICATION FILED JULY 7, 1903.

Witnesses:—
C. H. Schilling
Paul Arras.

Inventors:—
Rudolf Urtel
Paul E. Schilling

No. 782,473.

Patented February 14, 1905.

UNITED STATES PATENT OFFICE.

RUDOLF URTEL, OF BERLIN, AND PAUL E. SCHILLING, OF DRESDEN, GERMANY.

TOOTHED GEARING.

SPECIFICATION forming part of Letters Patent No. 782,473, dated February 14, 1905.

Application filed July 7, 1903. Serial No. 164,543.

*To all whom it may concern:*

Be it known that we, RUDOLF URTEL, of Berlin, and PAUL E. SCHILLING, of Dresden, Germany, German subjects, have invented certain new and useful Improvements in Toothed Gearing, of which the following is a specification.

Our invention relates to improvements in toothed gearing; and it consists more especially of a gear-wheel the teeth of which are formed on a rim having a limited sliding motion on the body of the wheel, both in peripheral and lateral direction. When this gear-wheel is caused to mesh with a second ordinary gear-wheel, the toothed rim freely rotates through a certain distance, whereby resistance in tangential direction during the first moments of meshing is avoided. On further rotation the rim, by a slot-and-pin device, slides laterally toward the second gear-wheel, and thereby insures perfect engagement of the wheels and avoidance of undue pressure during the critical period of first meshing. On disengagement of the wheels the rim takes up its initial position under the influence of a spring.

Figure 1:
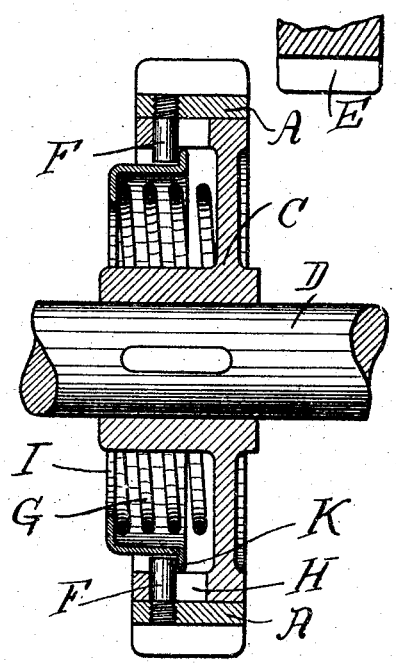
Figure 3:
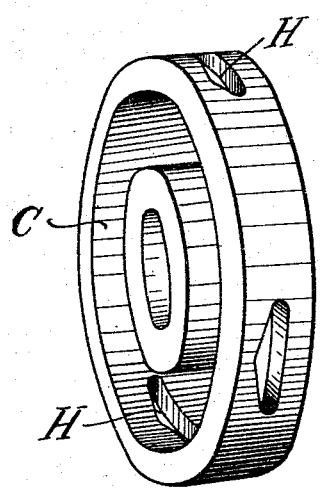
Figure 2:
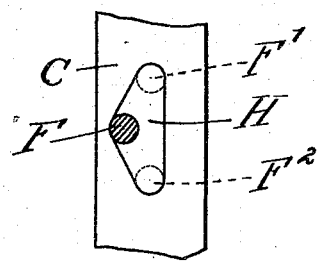

Our invention is illustrated by the accompanying sheet of drawings, Figure 1 of which represents a vertical sectional elevation through such a gear-wheel and a portion of the rim of the wheel with which it meshes. Fig. 2 is a plan of a portion of the face of the wheel on which the sliding rim is mounted. Fig. 3 is a perspective view (drawn to a smaller scale) of the body of the new gear-wheel with toothed rim removed.

Our improved gear-wheel consists, essentially, of a body C, the boss of which is keyed to the shaft D, and a toothed rim A, sliding on the body C. Projecting from the inside of the rim A are a number of pins F (for example, four or eight may be employed) each engaging in a triangular slot H, formed in the face of the body C. The rim A is held in the position shown, Fig. 1, by means of a spring G, contained in a shell I, the lip K of which is engaged by the said pins F.

When the wheel E is advanced toward the wheel AC, there is no resistance in tangential direction, since the rim A can rotate to a limited extent upon the body C. Thus apart from the slight pressure advancing the rim there are no forces acting such as frequently destroy the teeth of ordinary gear-wheels. Actual transmission of power will only commence when the rim A has rotated so far on the face of the wheel C that the pins F slide within the slots H either to F' or $F^2$, Fig. 2. During such movement of the pin, however, the rim A will be automatically pushed toward the right, Fig. 1, across the face of the wheel C— that is to say, the rim A advances a certain distance to meet the wheel E on the latter being caused to engage with it. The result of this advance is to automatically insure certain engagement of the two gear-wheels, while avoiding any considerable pressure during the critical period when the wheels commence to engage. Thus both the speed and certainty of engagement during such period are quite independent of hand adjustment. When the gear-wheels are disengaged, the reverse action takes place, the rim A automatically springs back immediately pressure is no longer transmitted from one wheel to the other. The forces acting on the pins F are easy to control in view of the long leverage.

The cost of such a gear-wheel is scarcely higher than that of an ordinary gear-wheel with bolted rim, since of the two gear-wheels only one has to be of the construction disclosed. Moreover, with our new gearing considerable economy in material and labor is effected, nor is space required greater than that necessary for ordinary gear-wheels.

What we claim is—

1. A gear-wheel, comprising a body having a triangularly-slotted face, a toothed rim sliding peripherally and laterally on said face, pins on said sliding rim engaging in said slots, and means for returning the rim to its initial position after it has been laterally displaced, substantially as described.

2. A gear-wheel, comprising a body having a triangularly-slotted face, a toothed rim sliding peripherally and laterally on said face and having pins engaging in said slots, and spring means for automatically returning the rim to its initial position, substantially as set forth.

3. A gear-wheel, comprising a body having a triangularly-slotted face, a toothed rim sliding peripherally and laterally on said face and having pins engaging in said slots, a shell held by the said pins, and a spring inclosed between said shell and wheel-body, substantially as described.

In witness whereof we have hereunto set our hands in the presence of two subscribing witnesses.

RUDOLF URTEL.
PAUL E. SCHILLING.

Witnesses:
PAUL ARRAS,
C. H. SCHILLING.